(12) United States Patent
Kim et al.

(10) Patent No.: US 11,339,706 B2
(45) Date of Patent: May 24, 2022

(54) INTEGRATED HYBRID POWER APPARATUS

(71) Applicant: KOREA AEROSPACE RESEARCH INSTITUTE, Daejeon (KR)

(72) Inventors: Keun Bae Kim, Daejeon (KR); Byeong Gyu Gang, Gyeongsangnam-do (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/908,565

(22) Filed: Jun. 22, 2020

(65) Prior Publication Data
US 2021/0172368 A1    Jun. 10, 2021

(30) Foreign Application Priority Data

Dec. 6, 2019    (KR) .................. 10-2019-0161764

(51) Int. Cl.
*F01P 3/02*    (2006.01)
*F01P 3/14*    (2006.01)
*F02F 1/40*    (2006.01)

(52) U.S. Cl.
CPC ....... *F01P 3/02* (2013.01); *F01P 3/14* (2013.01); *F02F 1/40* (2013.01); *F01P 2003/021* (2013.01)

(58) Field of Classification Search
CPC .................. F02F 1/40; F01P 3/14; F01P 3/02
See application file for complete search history.

(56) References Cited

U.S. PATENT DOCUMENTS

| 6,455,959 | B1* | 9/2002 | Demont ............ F01P 3/20 310/54 |
| 2004/0212273 | A1* | 10/2004 | Gould ............ H02K 7/006 310/254.1 |
| 2012/0152631 | A1 | 6/2012 | Oriet | |

FOREIGN PATENT DOCUMENTS

| DE | 3128081 A1 | 11/1982 |
| EP | 0492877 A1 | 7/1992 |
| KR | 20110074346 A | 6/2011 |
| KR | 101797011 | 11/2017 |
| WO | 02052132 A1 | 7/2002 |

OTHER PUBLICATIONS

Unique Cars and Pars, "How it Works: Water Cooling System," https://web.archive.org/web/20170423004416/https://www.uniquecarsandparts.com.au/how_it_works_water_cooling_system, Apr. 23, 2017 (Year: 2017).*
Extended European search report issued by the European Patent Office dated Jul. 23, 2020 for application 20178497.2.

* cited by examiner

*Primary Examiner* — Kevin A Lathers
(74) *Attorney, Agent, or Firm* — Holzer Patel Drennan

(57) ABSTRACT

An integrated hybrid power apparatus provided in a flying body includes a generator including a stator and a rotor, at least one engine disposed adjacent to the generator and including a cylinder, and a cooler configured to cool the generator and the engine and perform water-cooling that allows a coolant to circulate in the generator and the engine.

9 Claims, 7 Drawing Sheets

INTEGRATED HYBRID POWER APPARATUS

CROSS-REFERENCE TO RELATED APPLICATION(S)

This application claims the priority benefit of Korean Patent Application No. 10-2019-0161764 filed on Dec. 6, 2019, in the Korean Intellectual Property Office, the disclosure of which is incorporated herein by reference for all purposes.

BACKGROUND

1. Field

One or more example embodiments relate to an integrated hybrid power apparatus in which a water-cooling reciprocating engine and a water-cooling generator are integrated.

2. Description of Related Art

A cooling device of a reciprocating engine may need to allow a mechanical body to reach a normal operating temperature within a short period of time and then maintain a consistent normal operating temperature within all speed ranges under all operating conditions.

A cooling effect of the cooling device may depend on a type of a cooling medium (e.g., water, air, specific liquid), a flow velocity, a size of a radiating surface area of a radiator, a heat transfer property of a material, and a temperature difference between a cooling medium and an object to be cooled.

Such an additional cooling device described above may not be an exclusive way to cool the reciprocating engine. For the cooling, there are an air-cooling method and a water-cooling method.

In general, the water-cooling method may be more effective than the air-cooling method. However, a system for the water-cooling method may be more complicated and disadvantageous in terms of weight. Both the air-cooling method and the water-cooling method may be applied to an engine of a drone. However, a generator may generally use the air-cooling method, and thus may be disadvantageous in terms of efficiency.

For example, Korean Patent Application No. 10-2011-0074346 filed on Jul. 27, 2011, discloses a cooling module and a method of controlling the cooling module.

The above description has been possessed or acquired by the inventor(s) in the course of conceiving the present disclosure and is not necessarily an art publicly known before the present application is filed.

SUMMARY

An aspect provides an integrated hybrid power apparatus in which a water-cooling reciprocating engine and a water-cooling generator are integrated, thereby simplifying an overall engine-generator driving system.

Another aspect provides an integrated hybrid power apparatus that operates an integrated water-cooling system, thereby simplifying a cooling device and minimizing a cooling loss.

Still another example provides an integrated hybrid power apparatus that is reduced in size and weight, thereby reducing weight and vibration and working more effectively.

Yet another example provides an integrated hybrid power apparatus of which a rotor of a generator operates as a flywheel, thereby enabling a stable operation.

Additional aspects of example embodiments will be set forth in part in the description which follows and, in part, will be apparent from the description, or may be learned by practice of the disclosure.

According to an example embodiment, there is provided an integrated hybrid power apparatus provided in a flying body, the integrated hybrid power apparatus including a generator including a stator and a rotor, at least one engine disposed adjacent to the generator and including a cylinder, and a cooler configured to cool the generator and the engine. The cooler may perform water-cooling that allows a coolant to circulate in the generator and the engine.

The cooler may include a cooling fin formed on one side of the stator or the rotor, and a generator water jacket configured to surround the cooling fin.

The rotor may be disposed on an outer side the stator. The cooler may include a cooling fin protruding to an inner side of the stator, and a generator water jacket configured to surround the cooling fin on the inner side of the stator and form a coolant flow path inside.

The generator water jacket may include a coolant inlet port and a coolant outlet port. The coolant inlet port and the coolant outlet port may induce the coolant to flow.

The cooler may include a cylinder water jacket formed inside the cylinder of the engine and configured to form a coolant flow path. The cylinder water jacket may include a coolant inlet port and a coolant outlet port.

The coolant inlet port of the cylinder water jacket and the coolant inlet port of the generator water jacket may be connected to a coolant inlet. The coolant outlet port of the generator water jacket may be connected to the cylinder water jacket on one side thereof. The coolant outlet port of the cylinder water jacket may be connected to a coolant outlet.

The cooler may include a first piping of which one end is connected to the cylinder water jacket to feed the coolant to the cylinder water jacket, a second piping of which one end is connected to the first piping and the other end is connected to the coolant inlet port of the generator water jacket, a third piping of which one end is connected to the coolant outlet port of the generator water jacket and the other end is connected to the cylinder water jacket, and a fourth piping of which one end is connected to the cylinder water jacket to allow the coolant to be discharged from the cylinder water jacket.

According to another example embodiment, there is provided an integrated hybrid power apparatus provided in a flying body, the integrated hybrid power apparatus including a generator including a stator including a magnetic substance, and a rotor disposed on an outer side of the stator and including a magnetic substance, and a first engine and a second engine that are disposed on both sides of the generator. The first engine and the second engine may be disposed symmetrically with respect to the generator.

The stator may be disposed on an inner side of the rotor and the rotor may be disposed on an outer side of the stator. The rotor may perform a flywheel function through electrical output production and rotation.

The integrated hybrid power apparatus may further include a cooler including a coolant that circulates in the generator, and the first engine and the second engine. The cooler may include a cooling fin protruding to an inner side of the stator, a generator water jacket configured to surround the cooling fin on the inner side of the stator and form a coolant flow path inside, and a cylinder water jacket formed in a cylinder of the first engine or the second engine and configured to form a coolant flow path.

The cooler may include a first piping of which one end is connected to a cylinder water jacket of the first engine to feed the coolant to the cylinder water jacket of the first engine, a second piping of which one end is connected to the first piping and the other end is connected to a coolant inlet port of the generator water jacket, a third piping of which one end is connected to a coolant outlet port of the generator water jacket and the other end is connected to the cylinder water jacket of the first engine, a fourth piping of which one end is connected to the cylinder water jacket of the first engine to allow the coolant to be discharged from the cylinder water jacket of the first engine, a fifth piping of which one end is connected to a cylinder water jacket of the second engine to feed the coolant to the cylinder water jacket of the second engine, and a sixth piping of which one end is connected to the cylinder water jacket of the second engine to allow the coolant to be discharged from the cylinder water jacket of the second engine.

Figure 1:
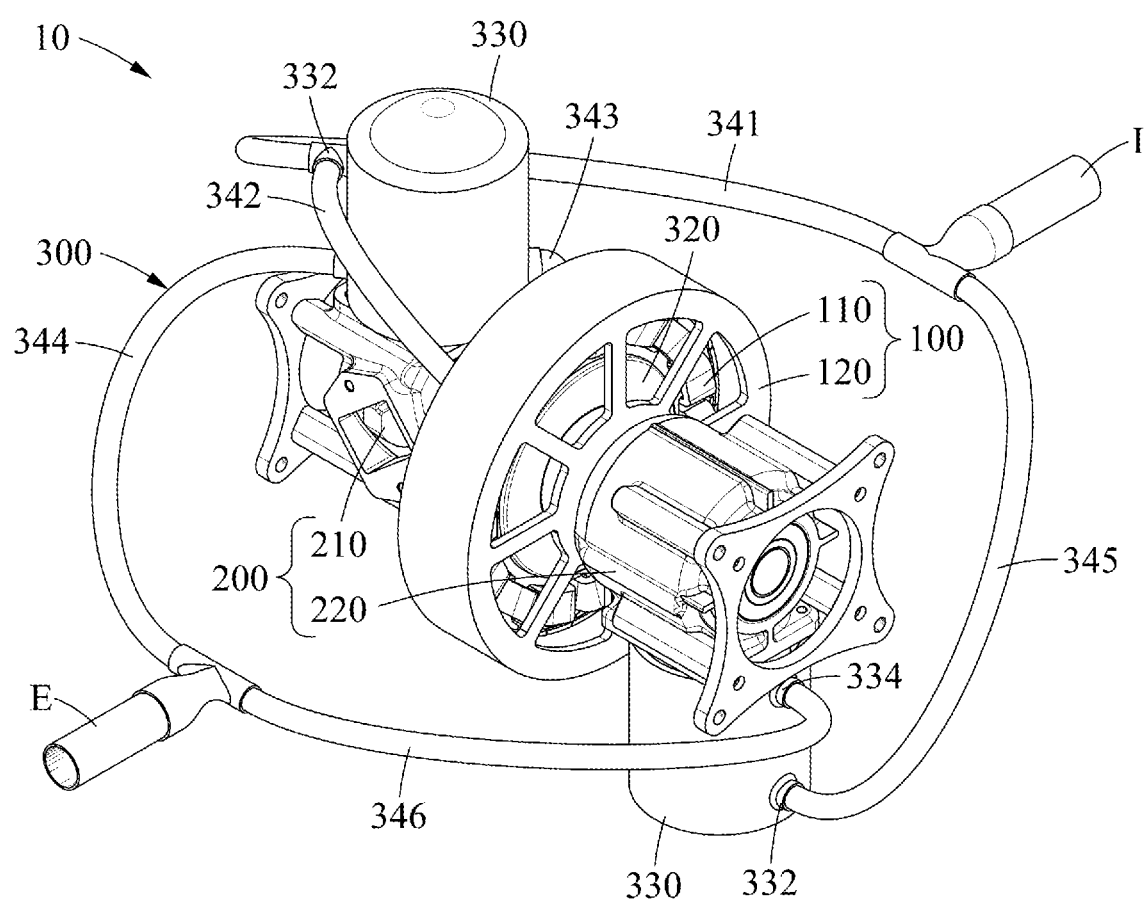
FIG. 1 is a perspective view of an integrated hybrid power apparatus according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order, or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a perspective view of an integrated hybrid power apparatus 10 according to an example embodiment.

Figure 2:
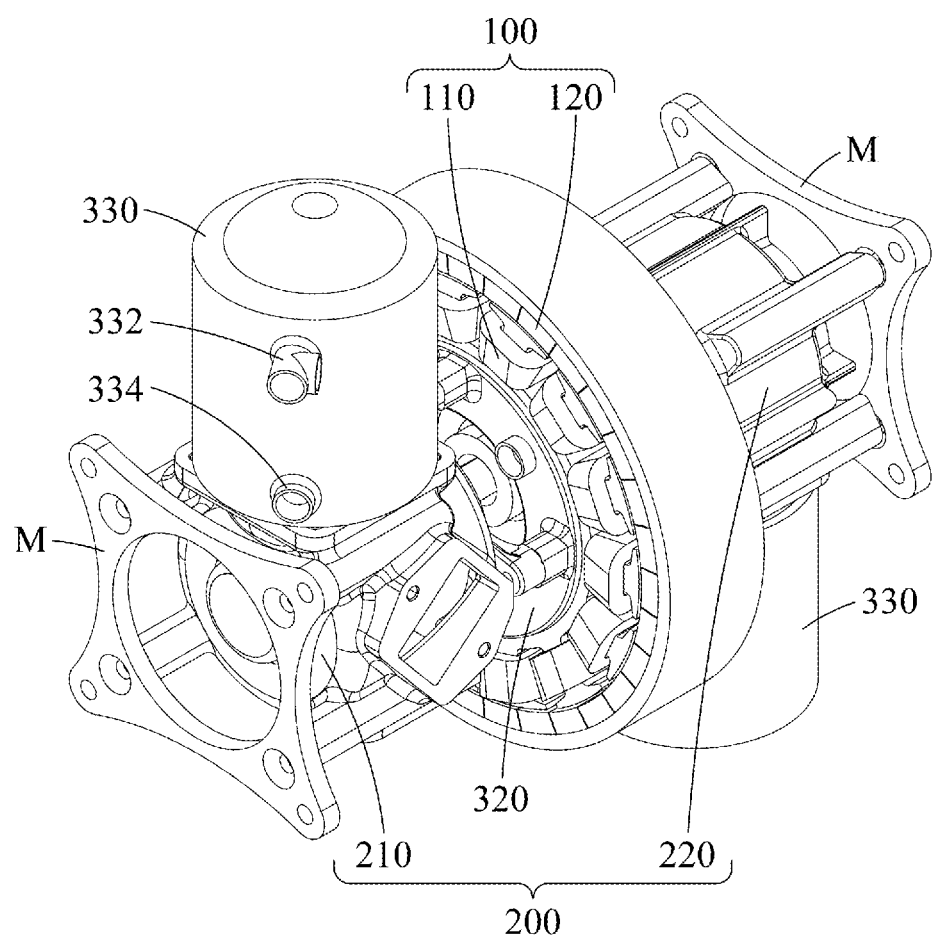
FIG. 2 is an enlarged perspective view of a generator and at least one engine according to an example embodiment.

FIG. 2 is an enlarged perspective view of a generator 100 and at least one engine 200 according to an example embodiment.

Figure 3:
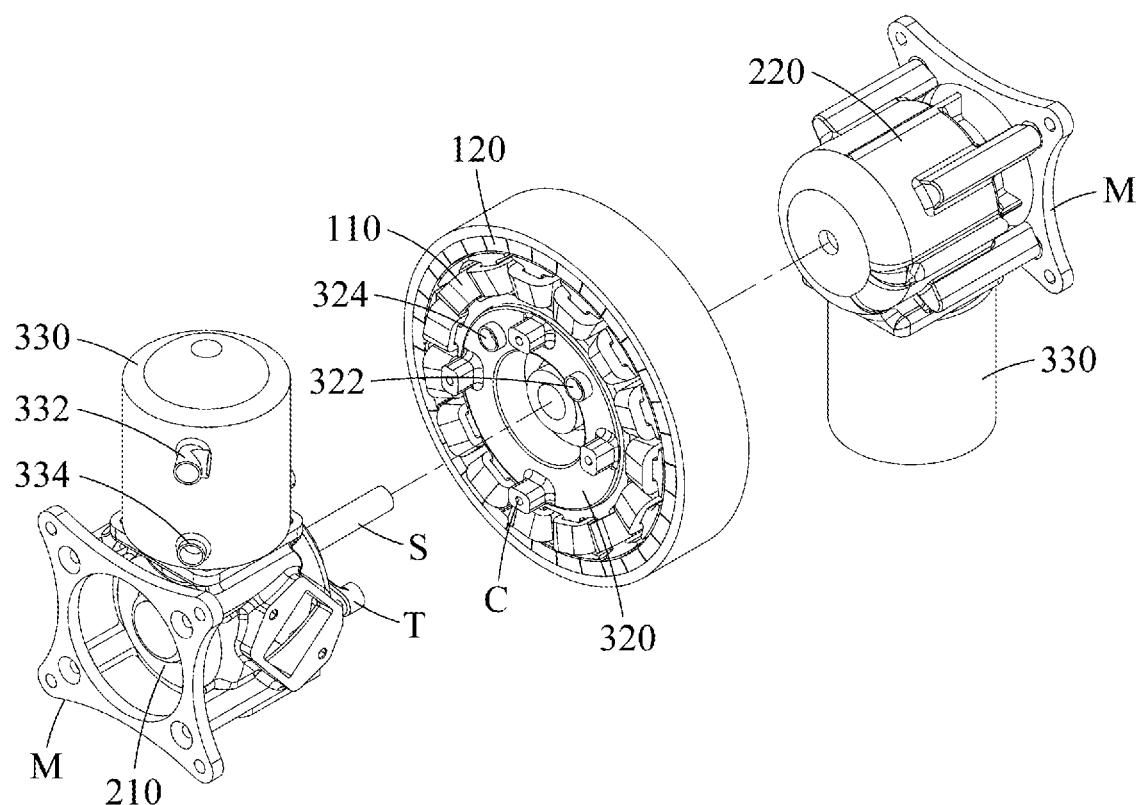
FIG. 3 is an exploded perspective view of a generator and at least one engine according to an example embodiment.

FIG. 3 is an exploded perspective view of the generator 100 and the engine 200 according to an example embodiment.

Referring to FIGS. 1 through 3, the integrated hybrid power apparatus 10, which may be provided in a flying body, includes the generator 100, the engine 200, and a cooler 300.

The generator 100 includes a stator 110 and a rotor 120 that include a magnetic substance. For example, the stator 110 of the integrated hybrid power apparatus 10 may be disposed on the outside of the rotor 120. However, the stator 110 may be disposed on the inside of the rotor 120 as needed. That is, the disposition of the stator 110 and the rotor 120 may vary, and not be limited to an example described in the foregoing.

The stator 110 is provided in a doughnut shape in which a plurality of electromagnets or magnetic substances (e.g., magnets) with an armature coil being wound around a groove of an iron core are disposed in a circumferential direction. The stator 110 has a space in which a generator water jacket 320 is to be disposed. In addition, the stator 110 has a center portion through which a drive shaft S passes.

Similar to the stator 110, the rotor 120 is provided in a cylindrical shape that surrounds the stator 110, in which a plurality of electromagnets or magnetic substances (e.g., magnets) with an armature coil being wound around an iron core are disposed in a circumferential direction. In addition, the rotor 120 is connected to the drive shaft S in a center portion (or centrifugal portion) of the rotor 120 and configured to directly receive mechanical energy of the engine 200 through the drive shaft S.

The generator 100 may be a device configured to convert mechanical energy to electrical energy. While the rotor 120 is rotating by receiving mechanical energy of the engine 200, the rotor 120 may generate electrical energy or output electric power along with the stator 110 according to the Faraday's law of electromagnetic induction. There may be a gap between the stator 110 and the rotor 120. The generator 100 may output and produce electric power and start the engine 200. Thus, an additional starting unit for the engine 200 may not be required. In addition, the rotor 120 may perform a flywheel function through the rotation. Thus, the rotor 120 may store or emit rotational energy, and allow the engine 200 to operate stably.

Referring to FIG. 2 or 3, the engine 200 is disposed adjacent to the generator 100, and may include a single cylinder or a plurality of cylinders. Alternatively, the engine 200 includes a first engine 210 and a second engine 220 disposed on both sides of the generator 100.

In detail, the engine 200 may be embodied as a single-cylinder or multi-cylinder reciprocating engine. The cylinder of the engine 200 is disposed adjacent to the generator 100, and may thus reduce an unnecessary weight or volume.

The engine 200 may include a third engine and a fourth engine, in addition to the first engine 210 and the second engine 220. The engine 200 may include further engines. The first engine 210 and the second engine 220 may form point symmetry by being disposed adjacent to both sides on a central axis of the generator 100, and thus facilitate weight balance and reduce vibration. That is, such symmetrical disposition of a plurality of engines may induce mechanical balance and reduce an unnecessary force or vibration, thereby contributing to control. Each of the first engine 210 and the second engine 220 includes a cylinder. In addition, each of the first engine 210 and the second engine 220 may include a piston, a connecting rod, a crank main journal, a crankpin, a counterbalance, and a crankcase.

The first engine 210 and the second engine 220 are disposed on both sides of the generator 100, and connected to the drive shaft S disposed at the center of the rotor 120 of the generator 100. In addition, for the connection to the generator 100, a stator mount T is mounted on one side surface outside a crankcase disposed under the cylinder of the first engine 210. To connect the generator 100 to the stator mount T, a stator connecting member C is mounted on one side surface of the generator water jacket 320 on an inner side of the stator 110 of the generator 100. The stator mount T and the stator connecting member C may be connected to each other to tightly connect the engine 200 and the generator 100. In addition, an engine mount M is provided on another side surface outside the crankcase of the engine 200, and may be provided in a fuselage of a flying body. As necessary, the engine mount M may be provided in one of the first engine 210 and the second engine 220.

Thus, the generator 100 may be disposed at the center of the engine 200, and the generator 100 and the engine 200 may be connected thereto. Thus, the generator 100 may transfer mechanical energy that is converted from heat of the engine 200 according to the first law of thermodynamics to the rotor 120 of the generator 100 disposed at the center. Thus, the generator 100 may convert the mechanical energy to the electrical energy.

Alternatively, a battery may be provided in the integrated hybrid power apparatus 10, and the generator 100 may convert electrical energy of the battery to mechanical energy to generate power. Alternatively, when the engine 200 is operating, the generator 100 may also operate simultaneously, and thus a greater amount of power (e.g., torque) may be generated. That is, the generator 100 may be used as a motor. When starting the engine 200, the generator 100 may generate power (e.g., torque) to start the engine 200. Here, the generator 100 may generate power regardless of whether the engine 200 operates or not.

Hereinafter, the cooler 300 of the integrated hybrid power apparatus 10 will be described in detail with reference to FIGS. 4A through 6.

Figure 4A:
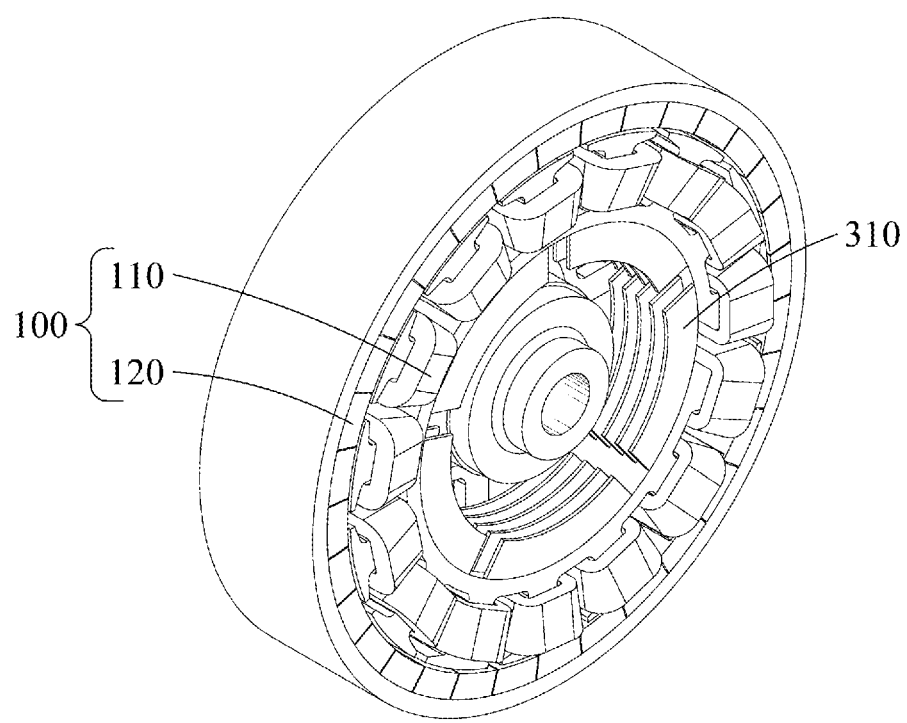
FIG. 4A is a perspective view of a generator and a cooling fin according to an example embodiment.
Figure 4B:
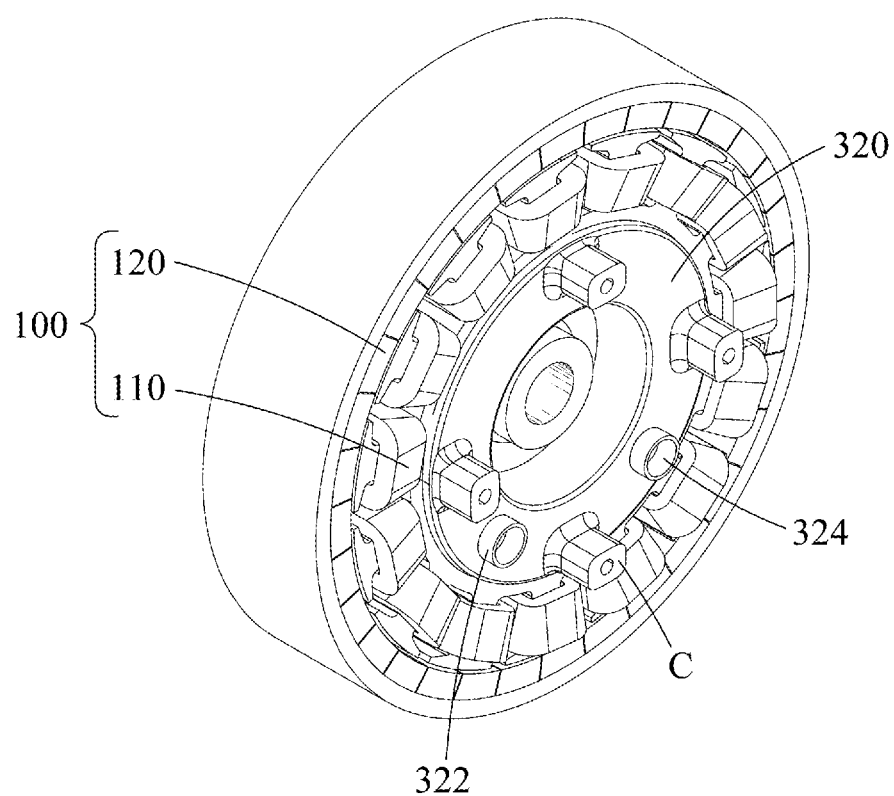
FIG. 4B is a perspective view of a generator and a generator water jacket according to an example embodiment.

FIG. 4A is a perspective view of the generator 100 and a cooling fin 310 according to an example embodiment, and FIG. 4B is a perspective view of the generator 100 and the generator water jacket 320 according to an example embodiment.

Figure 5:
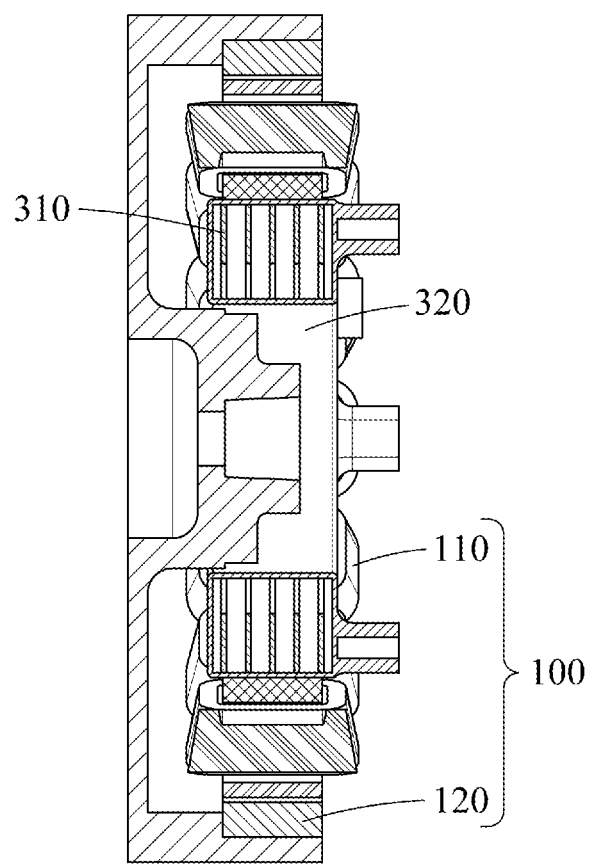
FIG. 5 is a cross-sectional view of a generator, a cooling fin, and a generator water jacket according to an example embodiment.

FIG. 5 is a cross-sectional view of the generator 100, the cooling fin 310, and the generator water jacket 320 according to an example embodiment.

Figure 6:
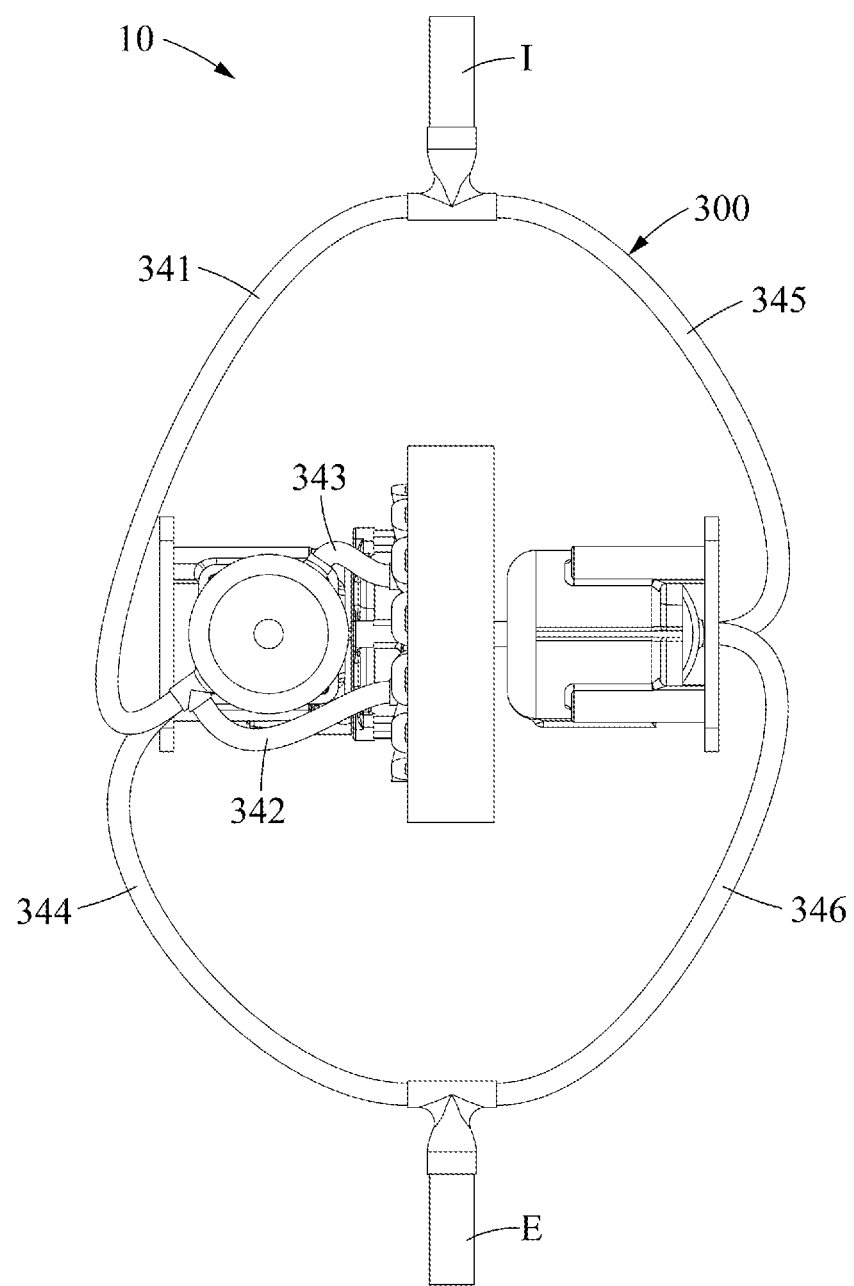
FIG. 6 is a top view of an integrated hybrid power apparatus according to an example embodiment.

FIG. 6 is a top view of the integrated hybrid power apparatus 10 according to an example embodiment.

Referring to FIGS. 4A through 6, the cooler 300 includes the cooling fin 310, the generator water jacket 320, a cylinder water jacket 330, a first piping 341, a second piping 342, a third piping 343, a fourth piping 344, a fifth piping 345, and a sixth piping 346.

The cooler 300 may perform, as a cooling method, water-cooling that allows a coolant to circulate in the generator 100 and the engine 200 to cool the generator 100 and the engine 200. Here, air-cooling that uses gas as a cooling medium may also be used as the cooling method. The cooling method and the cooling medium are not limited to what is described in the foregoing.

Referring to FIG. 4A or 5, the cooling fin 310 protrudes to an inner side of the stator 110 through heat conduction from the stator 110 and may be provided as a plurality of cooling fins at an interval in a circumferential direction. In addition, the cooling fin 310 may be provided as a plurality of cooling fins at an interval in an axial direction to increase a heat transfer area of the stator 110. The cooling fin 310 may be formed selectively on one side of the stator 110 or the rotor 120.

Referring to FIG. 4B or 5, the generator water jacket 320 is disposed on an inner side of the stator 110 and may be provided in a doughnut-shaped tubular form of which a cross section is a quadrangle and that surrounds the cooling fin 310. As the generator water jacket 320 surrounds the cooling fin 310, the generator water jacket 320 may form a coolant flow path inside through which a coolant flows. In addition, the generator water jacket 320 includes a coolant inlet port 322 and a coolant outlet port 324 on an outer side of the generator water jacket 320. The coolant inlet port 322 and the coolant outlet port 324 may induce a flow of the coolant. The generator water jacket 320 may be formed selectively on one side of the stator 110 or the rotor 120.

Referring to FIG. 1 or 6, the cylinder water jacket 330 is formed inside the cylinder of the engine 200 and forms a coolant flow path. The cylinder water jacket 330 includes a coolant inlet port 332 and a coolant outlet port 334. The cylinder water jacket 330 inside the cylinder of the first engine 210 further includes a port that induces the coolant discharged from the generator water jacket 320, in addition to the coolant inlet port 332 and the coolant outlet port 334. Each of the coolant inlet port 332 and the coolant outlet port 334 of the cylinder water jacket 330 may be a single port or a plurality of ports.

For integrated water-cooling of the generator 100 and the engine 200, the coolant inlet port 332 of the cylinder water jacket 330 of the first engine 210 and the coolant inlet port 322 of the generator water jacket 320 are connected to a coolant inlet I. The coolant outlet port 324 of the generator water jacket 320 is connected to the cylinder water jacket 330 of the first engine 210. The coolant outlet port 334 of the cylinder water jacket 330 of the first engine 210 is connected to a coolant outlet E. In addition, the coolant inlet port 332 of the cylinder water jacket 330 of the second engine 220 is connected to the coolant inlet I, and the coolant outlet port 334 of the cylinder water jacket 330 of the second engine 220 is connected to the coolant outlet E.

In detail, the coolant fed to the coolant inlet I is to be fed by being divided into the first piping 341 and the fifth piping 345. The first piping 341 has one end that is connected to the cylinder water jacket 330 of the first engine 210 to feed the coolant to the cylinder water jacket 330 of the first engine 210. The second piping 342 has one end that is connected to the first piping 341, and another end that is connected to the coolant inlet port 322 of the generator water jacket 320. Although the one end of the second piping 342 is connected to one side of the first piping 341, the second piping 342 may be connected directly to the coolant inlet I. The third piping 343 has one end that is connected to the coolant outlet port 324 of the generator water jacket 320, and another end that is connected to the cylinder water jacket 330 of the first engine 210. The third piping 343 may be connected directly to the coolant outlet E. The fourth piping 344 has one end that is connected to the cylinder water jacket 330 of the first engine 210 to allow the coolant to be discharged from the cylinder water jacket 330 of the first engine 210. The discharged coolant may flow out from the coolant outlet E. Thus, the coolant may cool the first engine 210 and the generator 100 while passing through the first piping 341, the second piping 342, the third piping 343, and the fourth piping 344 after being fed to the coolant inlet I.

The coolant fed to the coolant inlet I may be fed to the fifth piping 345 through the divided pipings. The fifth piping 345 has one end that is connected to the cylinder water jacket 330 of the second engine 220 to feed the coolant to the cylinder water jacket 330 of the second engine 220, and another end that is connected directly to the coolant inlet I. The sixth piping 346 has one end that is connected to the cylinder water jacket 330 of the second engine 220 to allow the coolant to be discharged from the cylinder water jacket 330 of the second engine 220, and another end that is connected to the coolant outlet E such that the discharged coolant may flow out from the coolant outlet E. Thus, the coolant may cool the second engine 220 while passing through the fifth piping 345 and the sixth piping 346 after being fed to the coolant inlet I.

As described above, the cooler 300 connected to the generator 100 and the engine 200 may be provided in an integral water-cooling type, and thus be more simplified in structure. Thus, the integrated hybrid power apparatus 10 may have a reduced weight or volume with the simplified structure, and thus operate more effectively. When forced convection is performed, a heat transfer coefficient may be higher in water-cooling than in air-cooling, and a heat transfer speed may also be higher in water-cooling than in air-cooling. Thus, water-cooling may be more effective in cooling than air-cooling. According to an example embodiment, the efficiency of the generator 100 and the engine 200 of the integrated hybrid power apparatus 10 may increase by the cooler 300 that is provided in the integral water-cooling type.

According to an example embodiment, the integrated hybrid power apparatus 10 may be provided in a flying body such as, for example, a drone, and be used for wherever power is needed according to a purpose. In addition, the cooler 300 configured to cool the generator 100 and the engine 200 is provided in an integral water-cooling type, and may thus simplify a power system as a whole and minimize a cooling loss.

In addition, the rotor 120 of the generator 100 of the integrated hybrid power apparatus 10 may operate as a flywheel, and thus enable a stable operation. In addition, the engine mount M that is structurally stable and the stator mount T of the generator 100 are applied, and thus may reduce vibration of the generator 100 and the engine 200 and improve overall performance. The overall size reduction and the weight lightening may reduce total weight and vibration, thereby enabling an effective operation.

According to example embodiments described herein, an integrated hybrid power apparatus may simplify an overall engine-generator driving system as it is provided in an integral form in which a water-cooling reciprocating engine and a water-cooling generator are integrated.

According to example embodiments described herein, an integrated hybrid power apparatus may operate an integrated water-cooling system, and thus simplify a cooling device and minimize a cooling loss.

According to example embodiments described herein, an integrated hybrid power apparatus may be reduced in size and weight, and thus reduce total weight and vibration and enable an effective operation.

According to example embodiments described herein, an integrated hybrid power apparatus may enable a stable operation as a rotor of a generator operates as a flywheel.

Advantageous effects of the integrated hybrid power apparatus described herein may not be limited to what is described in the foregoing, and other effects not described in the foregoing may be clearly understood by those skilled in the art from the description above.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An integrated hybrid power apparatus provided in a flying body, comprising:
a generator comprising a stator and a rotor;

at least one engine disposed adjacent to the generator and comprising a cylinder; and a cooler configured to cool the generator and the engine, the cooler comprising:

one or more cooling fins extending inward circumferentially from the stator or the rotor; and a generator water jacket that surrounds the cooling fins and forms a coolant flow path inside the generator, wherein the cooler performs water-cooling that allows a coolant to circulate in the generator and the engine.

2. The integrated hybrid power apparatus of claim 1, wherein the rotor is disposed on an outer side of the stator, and the cooling fins extend inward circumferentially from the stator.

3. The integrated hybrid power apparatus of claim 1, wherein the generator water jacket comprises a coolant inlet port and a coolant outlet port, wherein the coolant inlet port and the coolant outlet port are configured to induce the coolant to flow.

4. The integrated hybrid power apparatus of claim 3, wherein the cooler comprises a cylinder water jacket formed inside the cylinder of the engine and configured to form a coolant flow path, wherein the cylinder water jacket comprises a coolant inlet port and a coolant outlet port, wherein the coolant inlet port of the cylinder water jacket and the coolant inlet port of the generator water jacket are connected to a coolant inlet, the coolant outlet port of the generator water jacket is connected to the cylinder water jacket on one side thereof, and the coolant outlet port of the cylinder water jacket is connected to a coolant outlet.

5. The integrated hybrid power apparatus of claim 1, wherein the cooler comprises:

a first piping of which one end is connected to a cylinder water jacket to feed the coolant to the cylinder water jacket;

a second piping of which one end is connected to the first piping and the other end is connected to a coolant inlet port of the generator water jacket;

a third piping of which one end is connected to a coolant outlet port of the generator water jacket and the other end is connected to the cylinder water jacket; and a fourth piping of which one end is connected to the cylinder water jacket to allow the coolant to be discharged from the cylinder water jacket.

6. An integrated hybrid power apparatus provided in a flying body, comprising:

a generator comprising a stator comprising a magnetic substance, and a rotor disposed on an outer side of the stator and comprising a magnetic substance;

a first engine and a second engine that are disposed on both sides of the generator, wherein the first engine and the second engine are disposed symmetrically with respect to the generator; and a cooler configured to cool the generator, the first engine, and the second engine, the cooler comprising:

one or more cooling fins extending inward circumferentially from the stator or the rotor; and a generator water jacket that surrounds the cooling fins and forms a coolant flow path inside the generator, wherein the cooler performs water-cooling that allows a coolant to circulate in the generator, the first engine, and the second engine.

7. The integrated hybrid power apparatus of claim 6, wherein the stator is disposed on an inner side of the rotor and the rotor is disposed on an outer side of the stator, and the rotor is configured to perform a flywheel function through electrical output production and rotation.

8. The integrated hybrid power apparatus of claim 6, wherein the cooler further comprises:

a cylinder water jacket formed in a cylinder of the first engine or the second engine and configured to form a coolant flow path.

9. The integrated hybrid power apparatus of claim 8, wherein the cooler comprises:

a first piping of which one end is connected to a cylinder water jacket of the first engine to feed the coolant to the cylinder water jacket of the first engine;

a second piping of which one end is connected to the first piping and the other end is connected to a coolant inlet port of the generator water jacket;

a third piping of which one end is connected to a coolant outlet port of the generator water jacket and the other end is connected to the cylinder water jacket of the first engine;

a fourth piping of which one end is connected to the cylinder water jacket of the first engine to allow the coolant to be discharged from the cylinder water jacket of the first engine;

a fifth piping of which one end is connected to a cylinder water jacket of the second engine to feed the coolant to the cylinder water jacket of the second engine; and a sixth piping of which one end is connected to the cylinder water jacket of the second engine to allow the coolant to be discharged from the cylinder water jacket of the second engine.

* * * * *